(12) United States Patent
Lalancette

(10) Patent No.: US 7,537,741 B2
(45) Date of Patent: May 26, 2009

(54) GOLD AND SILVER RECOVERY FROM POLYMETALLIC SULFIDES BY TREATMENT WITH HALOGENS

(75) Inventor: Jean-Marc Lalancette, Sherbrooke (CA)

(73) Assignee: Nichromet Extraction Inc., Montreal, Quebec (CA)

( * ) Notice: Subject to any disclaimer, the term of this patent is extended or adjusted under 35 U.S.C. 154(b) by 0 days.

(21) Appl. No.: 11/937,815

(22) Filed: Nov. 9, 2007

(65) Prior Publication Data

US 2008/0112864 A1    May 15, 2008

Related U.S. Application Data

(63) Continuation of application No. 10/706,325, filed on Nov. 12, 2003, now abandoned.

(60) Provisional application No. 60/446,517, filed on Feb. 12, 2003.

(51) Int. Cl.
| | |
|---|---|
| C22B 3/12 | (2006.01) |
| C22B 11/06 | (2006.01) |
| C22B 13/00 | (2006.01) |
| C22B 15/00 | (2006.01) |
| C22B 19/00 | (2006.01) |
| C22B 21/00 | (2006.01) |
| C22B 23/00 | (2006.01) |
| C22B 25/00 | (2006.01) |
| C22B 61/00 | (2006.01) |

(52) U.S. Cl. .............................. 423/40; 423/23; 423/38; 423/43; 423/55; 423/84; 423/85; 423/92; 423/98; 423/101; 423/109; 423/122; 423/131; 423/140; 423/150.1

(58) Field of Classification Search .................. 423/23, 423/27, 28, 38, 39, 40, 47, 43, 55, 84, 85, 423/92, 98, 101, 109, 122, 131, 140, 150.1; 204/193

See application file for complete search history.

(56) References Cited

U.S. PATENT DOCUMENTS

| | | | |
|---|---|---|---|
| 3,674,669 A | 7/1972 | Tuwiner ..................... 204/528 |
| 4,541,994 A | 9/1985 | Lowenhaupt et al. .... 423/150.4 |
| 4,668,289 A | 5/1987 | Langer et al. ................. 75/744 |
| 4,919,715 A | 4/1990 | Smith et al. .................... 75/423 |
| 6,315,812 B1 | 11/2001 | Fleming et al. ............... 75/744 |
| 6,428,604 B1 | 8/2002 | Kerfoot et al. ................ 75/743 |
| 6,482,373 B1 | 11/2002 | Hannaford et al. ............ 423/47 |

FOREIGN PATENT DOCUMENTS

| | | |
|---|---|---|
| CA | 2367606 | 11/2000 |
| CL | 34344 | 6/1984 |
| CL | 37423 | 8/1990 |
| WO | WO 98/06878 | 2/1998 |
| WO | WO 02/053788 | 7/2002 |

OTHER PUBLICATIONS

Christy, Transaction of the American Institute of Mining Engineering, 17:3-11, 1988.
Crosadale, The Engineering and Mining Journal, 312-314, 1903.
Eisele, U.S. Bureau of Mines, Report No. 7489.
Engleston, In: The Metallurgy of Silver, Gold and Mercury in the United States, I:261-265, John Wiley & Sons, 1887.
Ferron, In: Chloride Metallurgy, vol. I:11-19, Canadian Institute of Mining, Metallurgy and Petroleum, 2002.
Frais, In: Chloride Metallurgy, vol. I:29-35, Canadian Institute of Mining, Metallurgy and Petroleum, 2002.
Hagenmuller, In: Nouveau Traite de Chimie Minerale, vol. III:647 and 693, Masson, 1968.
Kappes, In: Chloride Metallurgy, vol. I:69-78, Canadian Institute of Mining, Metallurgy and Petroleum, 2002.
Kruss and Schmidt, Berichte der Deutschen Chemichen Gesdellschaft, 20:2634, 1887.
Latimer, In: The Oxidation States of the Elements and Their Potentials in Aqueous Solutions, 56 and 62, Prentice Hall, 1952.
Moyes and Houllis, In: Chloride Metallurgy, vol. II:577-583, Canadian Institute of Mining, Metallurgy and Petroleum, 2002.
Varley, U.S. Bureau of Mines, Bulletin No. 211, 5-7, 1923.
Voigt and Blitz, Z. Anorg. Chem., 133:277, 1924.
"Precipitation metal hydroxide" http://www.acs.com.mx/equipos/precipitacion_de_hidroxidos_metalicos.htm, copyright ATL Tecnologia, S.A de D.V. 1998-2001, downloaded Jul. 18, 2008. (English translation).

Primary Examiner—Timothy Vanoy
Assistant Examiner—James Fiorito
(74) Attorney, Agent, or Firm—Fulbright & Jaworski L.L.P.

(57) ABSTRACT

A method for treating a polymetallic sulfide ore containing gold and/or silver, and further containing base metals selected from the group consisting of iron, aluminum, chromium, titanium, copper, zinc, lead, nickel, cobalt, mercury, tin, and mixtures thereof, is disclosed. The method comprises the steps of grinding the polymetallic sulfide ore to produce granules, oxidizing the granules to produce oxidized granules, and chloride leaching the granules using a brine solution including dissolved halogens, as well as chloride and bromide salts.

25 Claims, 5 Drawing Sheets

GOLD AND SILVER RECOVERY FROM POLYMETALLIC SULFIDES BY TREATMENT WITH HALOGENS

This application is a continuation of prior U.S. application Ser. No. 10/706,325, filed Nov. 12, 2003, which claims the benefit of U.S. Provisional Application No. 60/446,517, filed on Feb. 12, 2003. The entire contents of these applications are incorporated by reference.

FIELD OF THE INVENTION

The present invention relates to gold and silver recovery from polymetallic sulfides by treatment with halogens.

BACKGROUND OF THE INVENTION

The use of chemical agents, particularly halides, for the recovery of gold and silver is well known. It was noted very early that the adjunction of sodium chloride to mercury improved the performances of the amalgamation process. This discovery translated into the Patio or Cazo processes, which were implemented on an empirical basis from the early 1600's in Central and South America more than 150 years before the discovery of elemental chlorine by Scheele in 1774. The Patio method involved the digestion of a finely divided gold ore with mercury and sodium chloride, in the presence of air and moisture over a three month period. The values were then collected by further leaching with mercury, followed by amalgam distillation (Egleston, 1887).

Later, in the late 1700s, chloridizing roasting followed by barrel amalgamation was developed in Central Europe as an improved method for gaining access to precious metals from sulfide ores. This process called upon a high temperature treatment of the gold/silver ores in the presence of sodium chloride, air and steam, in order to transform the precious metal sulfides into their corresponding chlorides. The gold and silver was then recovered either by amalgamation or cementation on pure copper (Varley et al, 1923). However, it was discovered that the high temperature chloridizing of gold or silver ores resulted in very important losses of values by volatilization. In some cases these losses reached 80% or more of the precious metal content (Christy, 1888).

It appeared that the presence of pyrites or iron sulfides contributed significantly to the volatilization of gold and silver during high temperature chloridization with NaCl (Croasdale 1903). It was finally established that the mechanism explaining these losses involves the formation of a mixed chloride of gold and iron ($AuCl_3.FeCl_3$), which is highly volatile at chloridization temperatures (Eisele et al.).

Elemental chlorine dissolved in water, introduced by Plattner around 1850, constituted an alternative to high temperature chloridization. However, this process was characterized by low efficiency.

The general characteristics of the various processes involving chlorine, either as elemental chlorine or as chlorides, either at ambient temperatures or at high temperatures, were not attractive. The yields obtained with these processes were generally low (often below 50%) and the values were collected as amalgams or as cemented products on copper or iron. In addition, complex procedures were involved in order to obtain the precious metals in a pure form. The environmental impacts of such operations, where large amounts of sulfur are disposed with the tailings, would have been completely unacceptable by current standards.

The advent of cyanide extraction in 1916, terminated the extraction of gold by various forms of chloridation. The cyanide process calls upon the action of a cyanide salt such as sodium cyanide on gold in the presence of oxygen, to give a soluble gold salt (Eq. I):

$$2Au+4NaCN+\tfrac{1}{2}O_2+H_2O \rightarrow 2Na[Au(CN)_2]+2NaOH \qquad \text{(Eq. I)}$$

The gold can then be recovered from the cyanide complex by the action of excess zinc (Eq. II):

$$2Na[Au(CN)_2]+Zn_{(excess)} \rightarrow Na_2[Zn(CN)_4]+2Au \qquad \text{(Eq. II)}$$

Under the best circumstances, gold recovery can be as high as 98%. This process calls for a contact time of one to three days at near ambient temperature in the presence of air.

In some instances the cyanide process performs very poorly. Ores refractory to cyanide extraction can be grouped under the general term of polymetallic ores. In such ores, one finds small amounts of base metals such as copper or zinc, typically 0.1% Cu or 0.3% Zn. Such small amounts qualify the ore as of very low grade for the production of copper or zinc. If such a polymetallic ore body contains some gold (for example, 4 g/T Au or Ag or a mixture of both), the cyanide extraction process does not perform well. The poor performance is due to the base metals, either copper or zinc, (as well as silver), having a much stronger ability to form complexes with cyanide than gold. In fact, this inherent property is used to recover gold from a pregnant solution by zinc treatment following cyanide extraction (see Eq. II). The base metals will consume all the cyanide present and the gold extraction will only begin after all the available base metals, as well as silver, have been dissolved. Because of the excessive consumption of relatively costly cyanide, this process for recovering gold is uneconomical.

Polymetallic ores constitute complex mixtures of sulfides. The tailings discarded as a result of gold and silver extraction using the cyanide process, as well as by other methods, still contain very substantial amounts of sulfur. This sulfur is prone to bio-oxidation (*Thiobacillus ferrooxidans*), and the resulting drainage is quite acidic and toxic due to its metallic content.

The spent cyanide solutions, kept in large ponds following gold recovery, represents a substantial environmental hazard and has recently created major disasters in Guyana and Central Europe, thus restricting the use of the cyanide process in many areas.

In the last twenty years, chloridation has been reconsidered as a process for extracting base metals such as copper, nickel or silver. The *Intec Base Metal Process* (Moyes and Houllis, 2002) constitutes a typical example. This process calls for the digestion at 85° C., over a period ranging from 12 to 14 hours, of the sulfides of copper or zinc in a concentrated brine solution (250 g/l NaCl) comprising a cupric mixed halide ($BrCl_2$)Cu prepared electrolytically. The mixture is aerated and the copper is collected as cuprous chloride. The cuprous chloride is decomposed at the cathode to elemental copper by electrolysis upon regeneration of the mixed halide of copper (Eq. III):

$$2CuFeS_2+5BrCl_2^- \rightarrow 2Cu^{+2}+2Fe^{+3}+4S°+5Br^-+10Cl^- \qquad \text{(Eq. III)}$$

The above described chloridation process was reported as also extracting gold, if present. However, the requirement of recycling copper so as to have the cupric/cuprous system needed to oxidize iron and sulfur, makes this approach very cumbersome when the main concern is gold recovery rather than copper recovery. Further, the electrolytical oxidation of sulfur via the cupric salt, which is regenerated by electrolysis, is a very costly process rendering the treatment of a gold ore having a modest gold content uneconomical. Finally, the presence of elemental sulfur in the tailings is a potential source of acid drainage.

Another chloridation process called Platsol, was reported as being very efficient for the recovery of base and precious metals from sulfide ores (Ferron et al, 2002). This process involves a pressure oxidation in the presence of oxygen and sulfuric acid in an autoclave at a temperature above 200° C. The implementation of such a technique is very capital-incentive, calling for titanium autoclaves and a source of pure oxygen. The operation of this equipment is also prone to problems due to scaling of the reactor, complicating heat transfer. The sulfur resulting from the operation is in an innocuous form, i.e. a hydrated iron sulfate jarosite). The high capital and operating costs render this approach unattractive for polymetallic sulfides having a modest gold content.

Other techniques such as the Plint process (Frias et al, 2002) or, the Ito process (Kappes et al, 2002), are techniques used for the recovery of gold and silver from sulfides, by oxidation with ferric chloride in concentrated brine. The ferrous chloride is re-oxidized to ferric chloride by chlorine alone or by exposure to air and hydrochloric acid (Eq. IV):

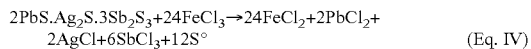

$$2PbS.Ag_2S.3Sb_2S_3+24FeCl_3 \rightarrow 24FeCl_2+2PbCl_2+ \\ 2AgCl+6SbCl_3+12S°$$ (Eq. IV)

In these processes, sulfur is again oxidized electrochemically via the oxidation of ferrous chloride by chlorine or HCl. As explained previously, such an approach is costly for the recovery of gold or silver from sulfide ores, because of the electrochemistry involved. Elemental sulfur is again discarded with the tailings, generating a potential source of acid drainage.

There thus remains a need for an improved method for the recovery of gold and silver from polymetallic ores.

The present invention seeks to meet these and other needs.

SUMMARY OF THE INVENTION

The present invention relates to a method for treating a polymetallic sulfide ore containing gold and/or silver, and further containing base metals selected from the group consisting of iron, aluminum, chromium, titanium, copper, zinc, lead, nickel, cobalt, mercury, tin, and mixtures thereof, comprising the steps of:
 (a) grinding the polymetallic ore to produce granules;
 (b) oxidizing the granules at temperatures of at least about 300° C. to produce oxidized granules;
 (c) chloride leaching the oxidized granules to produce a pregnant solution of solubilized metal chlorides and a barren solid;
 (d) recovering the barren solid from the pregnant solution to produce a purified pregnant solution; and
 (e) selectively recovering gold and/or silver from the purified pregnant solution yielding a solution essentially deprived of gold and/or silver.

The present invention further relates to a method for the recovery of gold and silver from polymetallic sulfide ores, characterized by low operational and cost investments.

The present invention also relates to a method for the recovery of gold and silver from polymetallic sulfide ores, characterized by being carried out at atmospheric pressure and at low oxidation temperatures prior to leaching.

In addition, the present invention relates to a method for the recovery of gold and silver from polymetallic sulfide ores, characterized by producing tailings devoid of elemental sulfur, sulfides, or soluble sulfates and by fast reaction rates allowing for high rates of treatment.

Furthermore, the present invention relates to a method for the recovery of precious metals such as gold and silver, as well as base metals such as copper, nickel, cobalt, zinc, tin and lead from polymetallic sulfide ores, in addition to relating to the safe removal of sulfur, arsenic and mercury as well as to the disposal of iron, chromium, aluminum and titanium in an inert and insoluble form.

Further scope and applicability will become apparent from the detailed description given hereinafter. It should be understood however, that this detailed description, while indicating preferred embodiments of the invention, is given by way of illustration only, since various changes and modifications within the spirit and scope will become apparent to those skilled in the art.

BRIEF DESCRIPTION OF THE DRAWINGS

In the appended drawings.

DETAILED DESCRIPTION OF THE INVENTION

Figure 1:
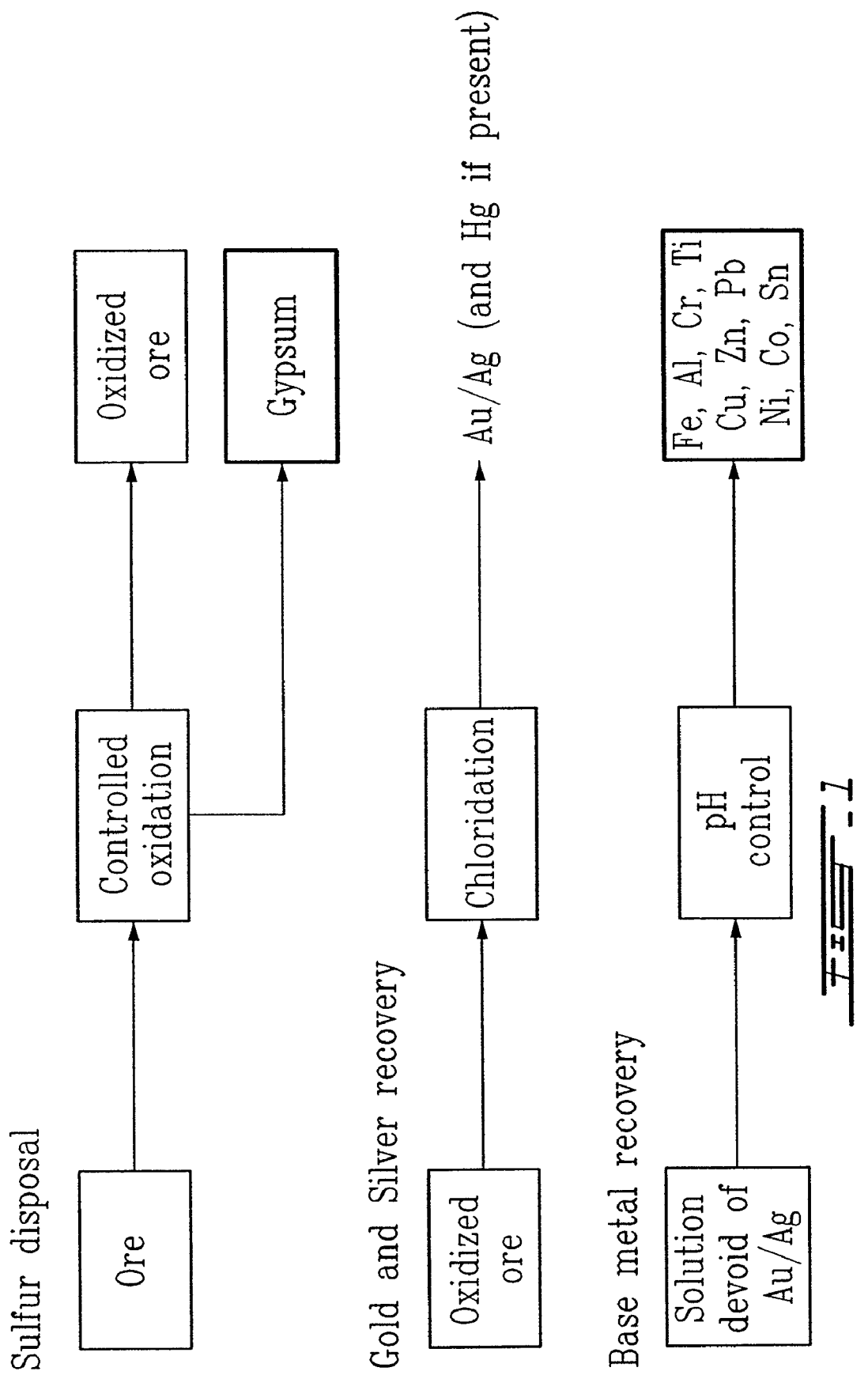
FIG. 1 is a block diagram illustrating the various steps of the method of the present invention.

Unless defined otherwise, the scientific and technological terms and nomenclature used herein have the same meaning as commonly understood by a person of ordinary skill. As defined herein, the terminology "recovering" is understood as being an operation resulting in the separation of a solid from a liquid. Non-limiting examples of such an operation include filtration techniques such as gravity filtration, pressure filtration, vacuum or suction filtration and centrifugation.

In a broad sense, the present invention relates to a new method for the recovery of precious metals such as gold and silver from polymetallic sulfide ores. In an other aspect, the present invention also relates to the safe removal of sulfur, arsenic and mercury as well as to the disposal of iron, chromium, aluminum and titanium in an inert and insoluble form. This is achieved at considerably lower cost than with the current chloridation or cyanide processes, by avoiding sulfur oxidation by electrochemical means. The method of the present invention is very time efficient, of the order of a few hours, and is carried out at atmospheric pressure and at oxidation temperatures of at least about 300° C. and preferably ranging from about 400 to about 600° C. The method allows for the separation of the precious metals as well as the base metals from the common metals, while recycling the reagents and releasing only inert waste materials into the environment.

In a preferred embodiment, gold and silver, and optionally base metals such as copper, zinc, lead, tin, nickel, cobalt and mercury can be recovered from polymetallic sulfide ores in yields generally well above 80% by the method of the present invention comprising the following preferred steps:
 oxidizing the polymetallic sulfide ore, preferably using lean air having about 10% $O_2$, at a temperature ranging from about 400 to about 600° C., to reduce the sulfur content of the ore to about 0.5% S (as sulfide) or less. Temperatures above 600° C. are also suitable but energy consumption is increased and sintering of the ore results. The resulting $SO_2$ is fixed by calcium carbonate as calcium sulfite, which auto-oxidizes to calcium sulfate dihydrate (gypsum). This results in the elimination of sulfur in a manner compatible with environmental regulations;

leaching the sulfur-free ore with a near-saturated (275 to 300 g/l) aqueous solution of sodium chloride (sodium brine), or a near saturated (190 to 225 g/l) aqueous solution of potassium chloride (potassium brine) and adding a solution of chlorine/HCl/hypochlorous acid such that the precious metals and the base metals are chlorinated and dissolved in the strongly complexing brine milieu. The chloridation reaction is advantageously and significantly accelerated by the preferred presence of a catalytic amount, less than one percent of the halides present in the brine, of bromide ions. The chlorine/HCl/hypochlorous acid solution, containing a catalytic amount of bromine, is generated by circulating a portion of the brine solution used to slurry the oxidized ore through the anodic compartment of an electrolytic cell, at a rate sufficient to dissolve the chlorine in the brine solution. Following the slurring operation, the ore is maintained in suspension in the acidic halogenated brine at a temperature ranging from about 35-45° C. by slow stirring, without aeration, for a period of 2-3 hours for most ores, and up to 5 hours for exceptionally refractory ores. After separating the barren solid followed by washing with brine, the combined filtrate and rinsings are circulated over activated carbon for gold and silver recovery; and treating the solution deprived of precious metals with a sodium hydroxide solution (or a potassium hydroxide solution if potassium brine was used) raising the pH to about 2.5-3.5. The sodium hydroxide (or potassium hydroxide) required to achieve this partial neutralization is produced by circulating the initial brine solution through the cathodic compartment of the electrolytic cell. The caustic sodium hydroxide solution (or potassium hydroxide solution) is generated concomitantly at the cathode, in a stoïchiometric ratio, with the chlorine/hydrochloric acid/hypochlorous acid solution produced at the anode of the electrolytic cell. Raising the pH to about 2.5-3.5 induces the precipitation of iron, aluminum, chromium and titanium as insoluble oxides of these metals, in various hydrated forms. These oxides are filtered and washed with brine. Raising the pH of the resulting filtrate to values above 3.5, induces the precipitation of the base metals such as copper, zinc, lead, tin, nickel and cobalt as a base metal concentrate.

Any arsenic, often present in significant amounts in polymetallic sulfide ores, is eliminated along with the sterile solids following leaching as ferric arsenate, an insoluble and inert arsenic salt. Mercury, if present, is largely recovered with the flue dusts after oxidation, and any remaining traces of this metal are lixiviated by the chlorinated brine, and recovered on carbon together with gold and silver.

The brine solution, following the removal of the metals, is recirculated for further leaching. The sterile solids are rinsed with water and the rinsings concentrated by evaporation, using waste heat from the sulfide oxidation step. The concentrated rinsings, along with the brine solution, are then recycled so as to prevent salt losses or salt release into the environment.

Figure 2:
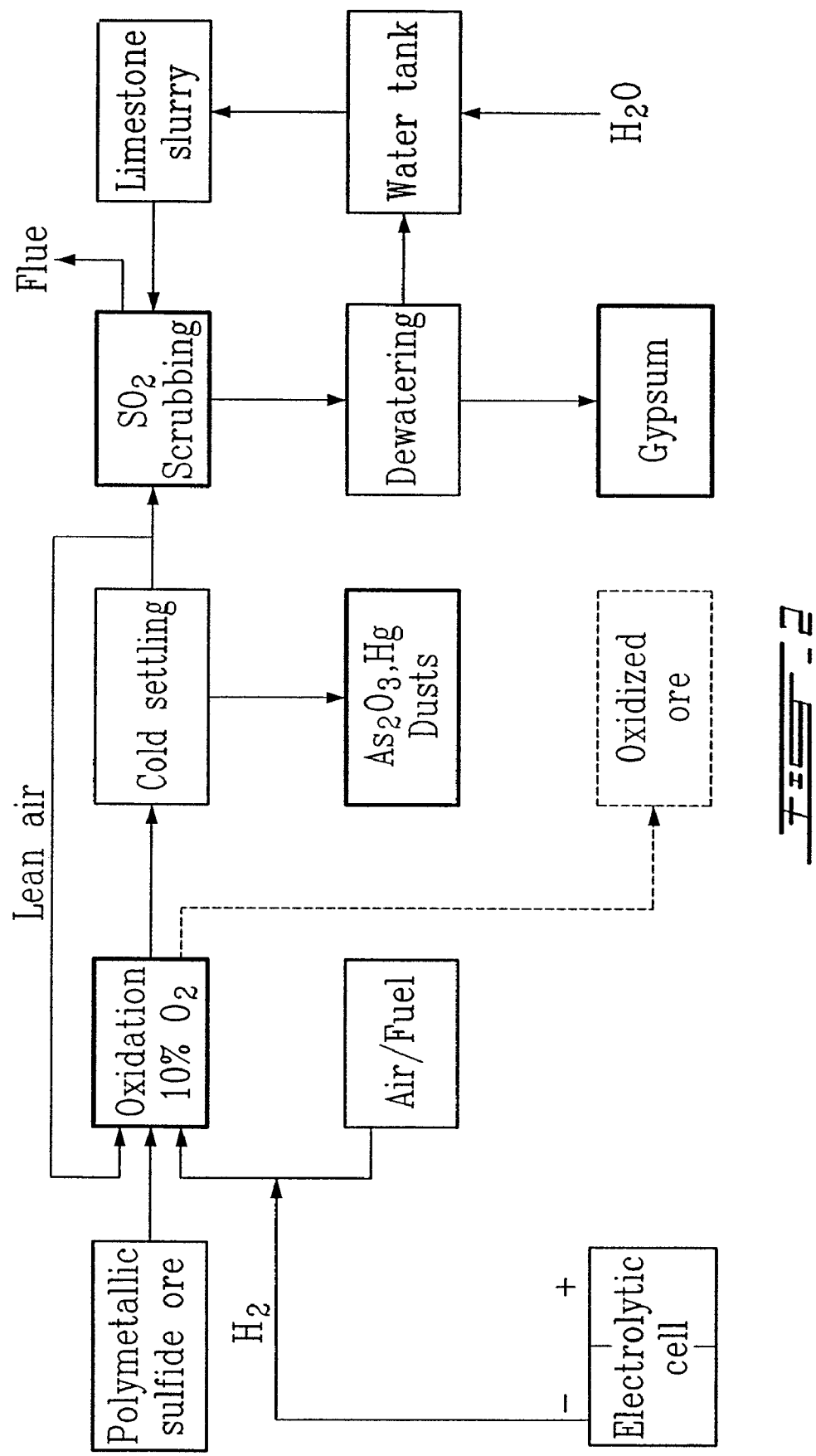
FIG. 2 is a block diagram illustrating the various steps of the sulfur removal aspect of the method of the present invention.

Sulfur Removal (FIG. 2)

The gold and/or silver containing ore, additionally comprising variable amounts of base metals such as Cu, Zn, Pb, Sn, Ni, and Co, is a sulfide or complex sulfide. The ore may further incorporate one or more other common metals such as iron, aluminum, titanium, chromium, as well as elements such as arsenic, antimony or bismuth. Mercury is occasionally also present in the ore.

The ore is reduced to a particle size of less than about 140 mesh by standard methods known in the art, such as crushing. The sulfur content of the ore, which can be as high as 15%, is reduced to about 0.5% or less (as sulfides) by controlled oxidation in a reactor or kiln. The reactor or kiln provides for a control of the oxygen content in the reaction chamber. A relatively low oxidation temperature, typically ranging from about 400 to about 600° C., is very advantageous since it prevents any sintering of the material and generates a solid product having a large surface area and having good reactivity. This treatment is much preferred to standard roasting where temperatures as high as 1200° C. have been observed. Such high reaction temperatures induce much sintering and volatilization. Standard roasting involves the free burning of the sulfides in the presence of excess air.

The control of the low oxidation temperatures is achieved by recycling part of the lean air back to the reactor. This allows for the oxygen content in the reactor to be maintained at values not exceeding 10% $O_2$. It is important to prevent sodium chloride present in the ore from being oxidized. It is well known that sodium chloride contaminations as low as 0.01 percent, can induce significant volatilization of gold and silver.

The gas stream from the oxidation reactor is cooled in a settling chamber, allowing for the collection of volatile oxides such as arsenic oxide, traces of zinc oxide, and metallic mercury if present in the starting ore, as well as other products generated during the oxidative treatment. Dusts carried mechanically from the fines in the reactor are also collected in the settling chamber. The amount of solids collected is generally small; less than one percent of the weight of the ore treated. The solids thus collected can be recovered and used for recuperation of values such as $As_2O_3$ or mercury, or they can be safely disposed of in sealed containers. The gas at the exit of the settling chamber, essentially composed of $SO_2$ and lean air, is partly redirected back to the oxidation reactor for oxygen level control, and partly directed to a $SO_2$ scrubbing unit. The $SO_2$ is adsorbed using a finely divided limestone slurry (200 mesh), allowing for the transformation of essentially all of the $SO_2$ (about 98%) into calcium sulfite, which auto-oxidizes to calcium sulfate dihydrate or gypsum. Gypsum is a very stable and inert product representing a definitive solution for the safe disposal of sulfur. It can be used as a building material in the production of Portland cement or as land fill. The water following the dewatering of the gypsum is recirculated back to a water thank. Since gypsum is a dihydrate, there is a net consumption of water in the scrubbing process. The gases freed of $SO_2$, are vented through a flue duct.

In the first step of the method therefore, the ore was made more reactive towards leaching, and essentially all of the sulfur initially present has been disposed of in a safe and environmentally compatible manner. The present approach constitutes an economically attractive alternative to the presently available methods. The current cost of electrochemically oxidizing 1% of sulfur in one metric ton of sulfide ore is $US 4.71 per unit percent of $S^{2-}$ per ton with a KWh at $US 0.09 per kilowatt and with an efficiency of 80%. The cost of oxidizing the sulfide content of an ore containing 10% $S^{2-}$ to elemental sulfur, using an electrochemically-produced reagent such as chlorine, would be in the best case scenario $US 47.10 per ton of ore for power only. The controlled oxidation of the sulfur content using lean air can be done at 10% or less of that cost, and transforms the sulfur into a safe and environmentally disposable form. The electrochemical oxidation process leaves elemental sulfur in the tailings generating a potential source of acid drainage.

Figure 3:
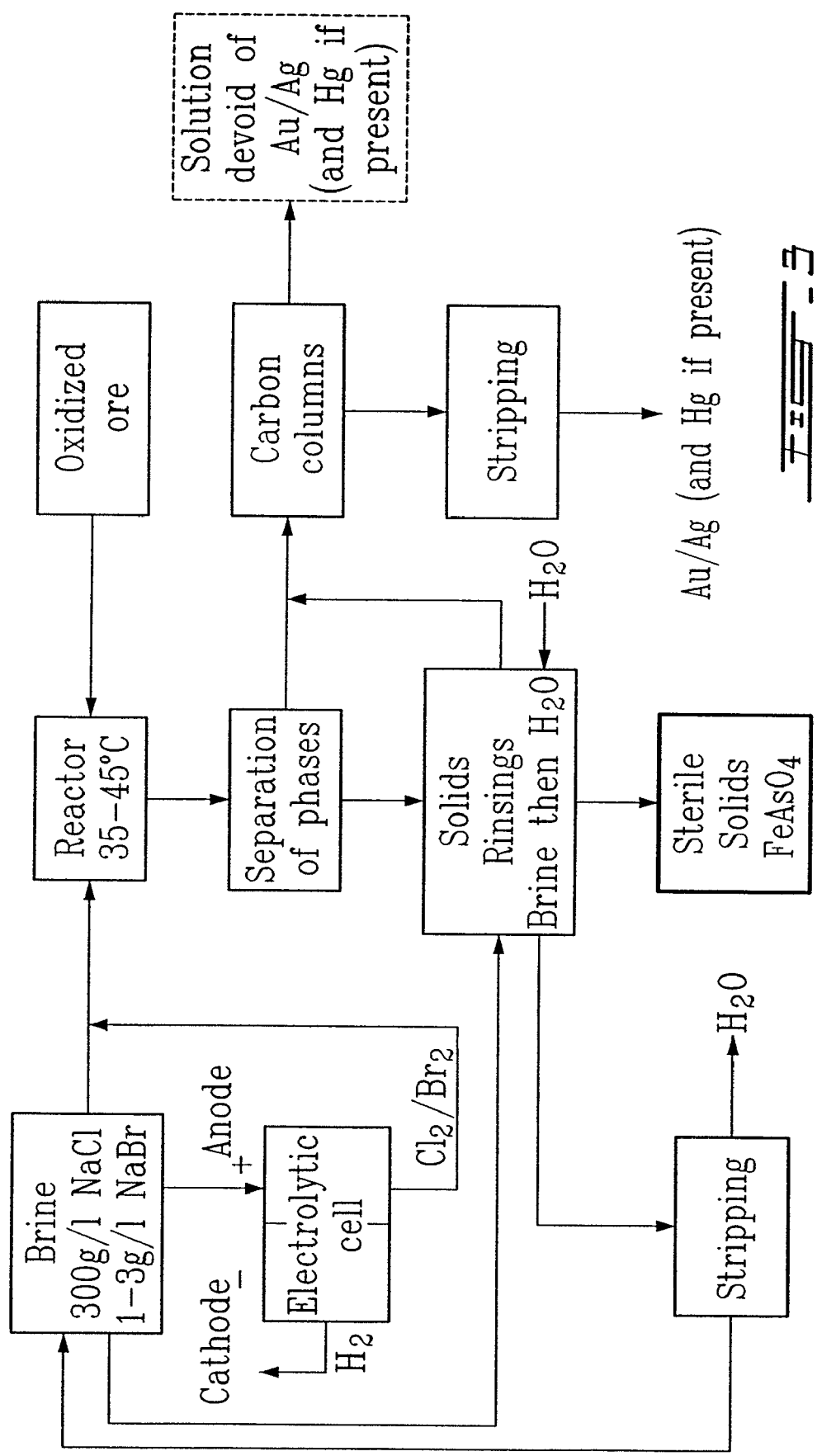
FIG. 3 is a block diagram illustrating the various steps of the gold and silver recovery aspect of the method of the present invention.

Gold/Silver Recovery (FIG. 3)

The recovery of gold and silver from the oxidized ore is achieved by leaching with a reagent comprising elemental halogens. The halogens ($Br_2$, $Cl_2$) have significantly different behaviors towards gold. Bromine can readily dissolve gold at room temperature, even in the absence of water (Kruss and Schmidt, 1887). Gold, on the other hand, is inert to dry chlorine at room temperature, and the attack of this gas on gold requires the presence of water and slight heating (Voigt and Biltz, 1924). Even though bromine is the more reactive reagent with gold, chlorine is more electronegative (Latimer, 1952):

$$Cl^- \rightarrow Cl_2 \, (-1.359\,V);$$

$$Br^- \rightarrow Br_2 \, (-1.07\,V).$$

It is possible to take advantage of this reactivity difference to accelerate gold leaching from the oxidized ore, if a catalytic amount of a bromide is introduced into the leaching solution. The leaching solution is a brine solution having a high concentration of chloride, i.e. from 275 to 300 g/l of NaCl or from 190 to 225 g/l of KCl. Lower salt concentrations yielded lower percentages of silver recovery, when silver was associated with gold in the oxidized ore. A portion of the concentrated brine solution, also containing a trace (1-3 g/l) of NaBr or KBr, is circulated in the anodic compartment of an electrolytic cell, at an appropriate rate, so as to dissolve the halogen liberated at the anode. As mentioned above, the bromide ion will be reduced first, followed by some chloride ions so as to give a mixture of halogens dissolved in the brine solution. The brine solution containing dissolved $Cl_2$ and $Br_2$ is mixed with fresh brine from a brine tank to provide a volume of liquid necessary to form a 20% slurry with the oxidized ore in a reactor kept at 35-45° C. The slurry is slowly stirred in order to prevent settling of the ore. The reacting mass was not aerated since aeration was neither improving the reaction rate nor the reaction yield, instead it resulted in the loss of dissolved halogens. Due to the trace amounts of bromine in the system, the gold leaching process is believed to involve the initial formation of gold tribromide (Eq. V):

$$2Au+3Br_2 \rightarrow 2AuBr_3 \tag{Eq. V}$$

The gold tribromide is then believed to be transformed, because of the stronger oxidizing capacity of $Cl_2$, into gold trichloride with the concomitant regeneration of elemental bromine (Eq. VI):

$$2AuBr_3+3Cl_2 \rightarrow 2AuCl_3+3Br_2 \tag{Eq. VI}$$

A similar type of reaction is obtained for silver, the high concentration of chloride allowing the solubilization of the silver halides by complexation.

In the course of the leaching reaction, the other ions are similarly solubilized, and exist at their maximum valency; copper as cupric chloride, iron as ferric chloride, tin as stannic chloride, and arsenic as arsenate ($As^{+5}$). Particularly with arsenic, the strong oxidizing environment leads to the precipitation of all the arsenic as an insoluble and inert ferric arsenate (Eq. VII):

$$Fe^{3+}+AsO_4^{-3} \rightarrow FeAsO_4 \tag{Eq. VII}$$

The pH of the reaction mixture drops below 0.1 as the leaching reaction proceeds. This strong acidification is an indication of the reaction of chlorine with water (Eq. VIII):

$$H_2O+Cl_2 \rightarrow HCl+HOCl \tag{Eq. VIII}$$

The presence of hypochlorous acid could account for the observed chloridation of gold by chlorine in the presence of water. A similar equation can be written to describe the behavior of bromine, which is in equilibrium with hydrobromic acid and hypobromous acid. The solubilized species can therefore be seen as a mixture of chlorides and hypochlorides, which eventually end up as chlorides when the hypochlorous ion decomposes with the concomitant evolution of nascent oxygen (Eq. IX):

$$HOCl \rightarrow HCl+\tfrac{1}{2}O_2 \tag{Eq. IX}$$

The production of nascent oxygen accounts in part for the very strong oxidizing capability of the system without aeration of any sort.

The duration of the leaching, preferably at 35-45° C. in the reactor, usually ranges from 2 to 3 hours. With exceedingly refractory ores it is necessary to extend the contact time to, for example, about 5 hours. Following the leaching, the slurry is filtered or centrifuged, producing a pregnant solution and a waste or barren solid.

The barren solid was first rinsed with brine in order to recover any held-up values in the cake, followed by washing with water to recover any salt. The so-obtained tailings contain arsenic as an iron arsenate, and are free of sulfur and of soluble base metals. The pregnant solution is circulated over carbon to collect the gold and silver. Following the recovery of gold and silver from the carbon by known methods, these precious metals are obtained by electrowinning or other standard techniques such as ion exchange and precipitation. The gold/silver-free solution is then recovered to be further treated so as to collect the base metals.

Figure 4:
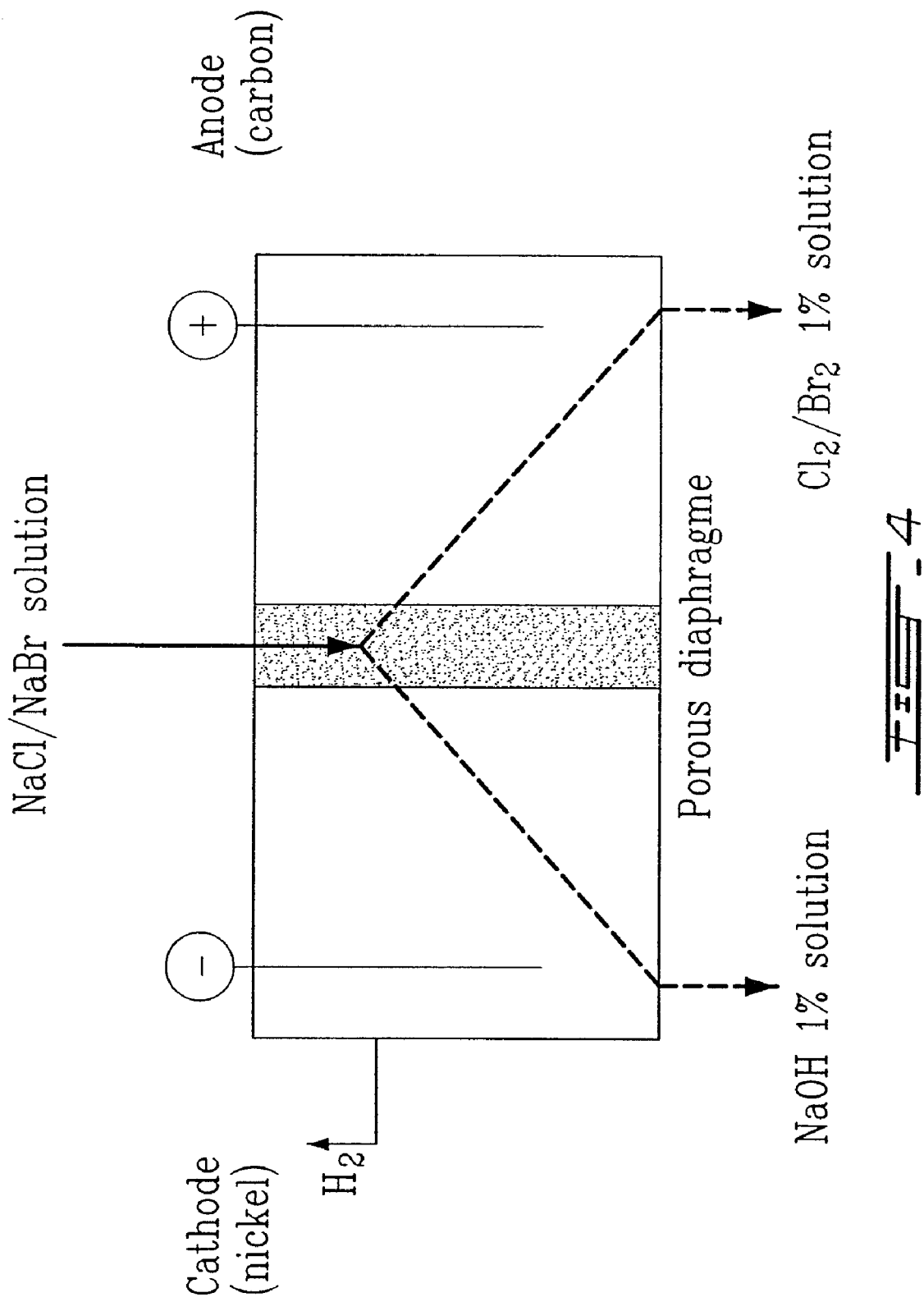
FIG. 4 is a block diagram illustrating the various steps of the base metal recovery aspect of the method of the present invention.
Figure 5:
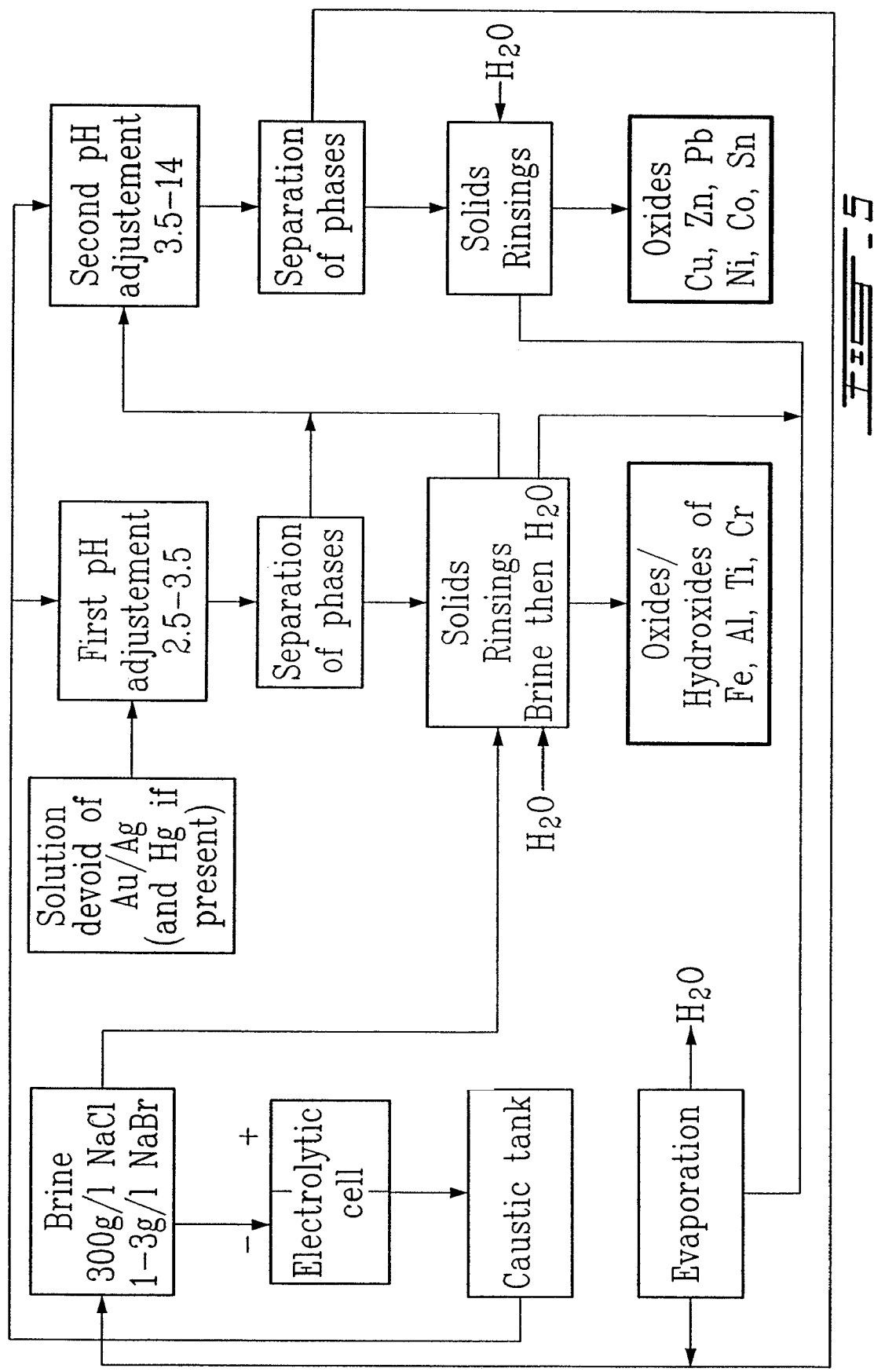
FIG. 5 is a schematic illustration of an electrolytic cell used in the method of the present invention.

Recovery of Base Metals (FIG. 4)

The base metals to be obtained from the leaching of gold-bearing polymetallic sulfide ores are of two categories. The first category contains metals of relatively high commercial value, often obtained by pyrometallurgical operations. This category contains metals such as nickel, cobalt, copper, zinc, lead, tin and mercury. The second category contains metals of low economic value, and comprises predominantly iron with considerably smaller amounts of aluminum, titanium, chromium and traces of the p-bloc elements.

In order to isolate these two types of base metals, sodium hydroxide is generated in the cathodic compartment of the electrolytic cell. The sodium hydroxide solution is accumulated in a caustic tank and is then used to raise the pH of the previously produced barren solution, devoid of gold and silver, leaving the carbon columns, from below 1 to about 2.5 to about 3.5. At a pH ranging from about 2.5 to about 3.5, any iron existing as $Fe^{+3}$ is instantaneously precipitated by hydrolysis as a hydrated iron oxide. Titanium, aluminum and chromium react similarly within this pH range. The hydrated oxides are removed by filtration. The solids are rinsed with brine in order to recuperate any base metals of values held up in the solid cake, followed by washing with water to remove any traces of salt. The salt-free mixture of oxides is then discarded as an insoluble and inert material of little or no commercial value.

The solution obtained from the filtration and the brine rinsings contains the base metals of value. Mercury, if present, was recovered on carbon together with gold and silver. The pH of the mercury-free solution, pH between about 2.5-3.5, is further raised using an additional portion of the sodium hydroxide solution to values above 3.5, causing all of the base metals (Ni, Co, Cu, Zn, Pb, Sn) to precipitate as oxides or hydrated oxides. The oxides are removed from the mixture by filtration and are rinsed with water to remove any traces of salt, to provide a concentrate of metals having significant commercial value. The brine, being free of metals, is recycled back to the fresh brine reservoir. The rinsings are concentrated by evaporation so as to give a brine solution of appropriate concentration, and which is also recycled back to the fresh brine reservoir.

The implementation of the process of the present invention, using a large variety of gold-bearing polymetallic sulfide ores, provides for the recovery of gold and silver in high yields, essentially always above 80% and frequently above 85%. The process of the present invention also provides for the recovery in high yields of the base metals of commercial value, frequently above 85%.

Of all the base metals of little commercial value, iron is generally the predominant one. Following the oxidation of the sulfides at 400-600° C., the resulting iron oxide is quite inert and no more than about 20-25% of this iron is leached, thus significantly decreasing the power consumption of the process. In fact, for a KWh costing US$ 0.09, and with an efficiency at the electrolytic cell of 80%, each percent of iron in the ore would cost US$ 1.00 of power to take care of, and each percent of base metals such as copper or zinc in the ore would cost US$ 2.36 of power to extract. Thus, for an ore having 1% copper and 8% iron, the value of recovered copper (US$ 16.50 at US$ 0.75/lb for copper) covers all the electrolytical power costs (US$ 10.36) plus a fair reserve and no power imputations have to be made against the gold and silver values recovered.

Using the process of the present invention, polymetallic sulfide ores containing gold and/or silver which do not qualify for base metals extraction either because of a low base metal content, problems of enrichments by flotation or other restrictions, can be treated economically from the return generated by the base metals in order to collect the precious metals. Consequently, the process of the present invention provides for an attractive alternative to the currently available technologies, allowing the treatment of ores or tailings previously not attractive, at a profit.

The recycling of the brine solution, and the disposal of sulfur, arsenic and metal oxides as stable and inert solids, reduces the environmental impacts of the operation to a minimum. Furthermore, the implementation of the process of the present invention at low oxidation temperatures, at near ambient chloridation temperatures and at atmospheric pressure, reduces the investment per unit weight of ore to very competitive values. Finally, the low temperature oxidation of sulfur being an exothermic process, the energy consumption at that level is minimal and much lower than the corresponding electrochemical oxidation of sulfide to elemental sulfur.

The process of the present invention was tested using a variety of polymetallic sulfide ores and tailings containing gold and silver.

EXAMPLES

Example 1

A Canadian ore sample (90 g) from the Sudbury (Ontario) area containing 4.5 g/T Au, 8 g/T Ag, 0.1% As, 7.5% S, 5.5% Fe, 0.1% Ni, 0.008 Co and 0.5% Cu was reduced to a particle size of about 140 mesh and heated at 585-600° C. in an atmosphere composed of $N_2$ (50%) and air (50%), over a period of two hours in a Vycor™ tube heated externally in a Lindberg™ furnace. The temperature was measured inside the mass being oxidized. The external heating was reduced when the oxidation began at around 400° C.

A small amount of a white deposit, arsenic oxide, could be observed at the discharge side of the Vycor™ tube. The color of the oxidized material changed from black to brown and the weight loss during the process was about 12%.

A sample of the oxidized material (25.0 g) was placed in a three-necked one liter flask, along with 500 g of water, 150 g of sodium chloride and 1.2 g of sodium bromide. The suspension was stirred magnetically and the flask was closed so as to exclude air from entering the system.

The slurry was extracted from the flask through one of the necks using a peristaltic pump, and was subsequently circulated through the anodic compartment of an electrolytic cell operating with a brine solution having the same concentration as the brine solution in the flask (anode of graphite, operation at 2.5 V). The anodic fluid was returned to the flask after dissolving chlorine. The cell was operated on and off in such a manner as to maintain a slight reddish coloration in the flask indicative of the presence of free bromine.

The reaction flask was maintained at 40° C. for a period of 2.5 hours after which it was filtered on a Buchner funnel. The solid was rinsed three times with a brine solution containing 300 g/l NaCl. The mixed filtrate and rinsings were very acid, having a pH below 1.0. The acidic filtrate and rinsings were then treated with 30 g of carbon (Norit™ RO3515) so as to collect gold and silver. The barren solid was then rinsed with water to completely remove any traces of brine (negative test to $AgNO_3$), dried at 110° C. (16.8 g) and submitted to elemental analysis. The elemental analysis indicated that 96% of the gold and 94% of the silver initially present in the oxidized material, were leached out and then adsorbed on the carbon.

The solution following contacting with carbon was combined with the aqueous rinsings and was submitted to elemental analysis. The solution was found to be essentially free of gold and silver, and contained 99% of the extracted iron, 98% of the nickel and copper and 91% of the cobalt present in the starting oxidized ore sample. Adjusting the pH to about 3.5 with sodium hydroxide resulted in the precipitation of the iron. Further raising the pH to about 8.5 precipitated the nickel, cobalt and copper. The brine, being essentially free of metals, is available for further use. It was noted by elemental analysis that the bromine content in the brine did not change during the process, taking into account the dilution induced by the rinsings. Further, it was found that the gold and silver content following treatment (in the sterile residue), was below 0.05 g/T and 0.16 g/T respectively, while 23% of the iron was extracted.

The process was repeated using several types of polymetallic sulfide ores containing gold, silver or both, along with base metals of value. All the operational parameters, except the duration of the digestion, were the same as in Example 1. Those results are reported in Table I.

Example 2

A sample of ground ore (100-200 mesh) from the Pueblo Viejo deposit (100 g), Dominican Republic, and containing 3.0 g/T Au, 2.25 g/T Ag, 0.28% Zn, 0.025% As, 5.8% Fe and 4.9% S (as sulfides) was oxidized at about 600° C. for a period of 2 hours in lean air (about 10% $O_2$).

The oxidized material was then leached using KCl brine (50.0 g of oxidized ore in 500 mL of KCl brine (200 g KCl/L) containing 2.0 g KBr). The suspension was stirred at 45° C. for a period of two hours, while in the presence of chlorine (0.7 g), added to the slurry at the beginning of the contact.

The slurry was filtered, the cake rinsed with KCl brine (200 g KCl/L) and then washed with water. The combined brine filtrate, rinsings and washings were analyzed for gold, silver and zinc. The gold recovery was of the order of 87%; the silver recovery was of the order of 61%; and the zinc recovery was of the order of 99%. Essentially all of the arsenic was found in the barren solid, and none was present in the brine or water rinsings.

Although the present invention has been described hereinabove by way of preferred embodiments thereof, it can be modified, without departing from the spirit and nature of the subject invention as defined in the appended claims.

TABLE 1

Treatment of polymetallic ores

| Ex. | Deposit site | Country | Precious metals content (g/T) Au | Ag | Base metals content (%) Cu | Zn | Others | Sulfur content % | Duration (hours) | Recovery % Au | Ag | Cu | Zn | Others |
|---|---|---|---|---|---|---|---|---|---|---|---|---|---|---|
| 2 | Zacateca*** | Mexico | 3.5 | 8.0 | 0.3 | 0.1 | Pb: 0.8 | 7.5 | 2.0 | 94 | 92 | 98 | 96 | Pb: 91 |
| 3 | Cassandra* | Greece | 28 | 12 | — | 1.0 | Pb: 1.5 | 11.0 | 3.0 | 96 | 95 | — | 98 | Pb: 94 |
| 4 | Potosi*** | Bolivia | 3.0 | 5.8 | 0.5 | — | Sn: 1.9 | 8.8 | 3.0 | 96 | 92 | 99 | — | Sn: 89 |
| 5 | Red Lake* | Canada | 17.0 | 16.5 | 0.2 | 0.8 | — | 7.3 | 2.5 | 95 | 96 | 98 | — | — |
| 6 | Rosario*** | Dom. Republic | 3.37 | 34.7 | 0.01 | 1.1 | — | 4.5 | 3.5 | 85 | 91 | 95 | 95 | — |
| 7 | Moore* | Dom. Republic | 5.5 | 8.0 | 0.01 | 1.1 | — | 6.0 | 5.0 | 85 | 88 | 98 | 99 | — |
| 8 | Italian Smelter** | Italy | 52 | 5100 | 1.13 | 8.06 | Pb: 5.18 Hg: 1130 ppm | 11.8 | 2.5 | 97 | 87 | 96 | 97 | Pb: 99 Hg: 99.9 |
| 9 | Rio Narcea** | Spain | 231 | 248 | 25.2 | 0.39 | Pb: 0.14 | 18.5 | 3.5 | 98 | 96 | 99 | 95 | Pb: 92 |

*fresh ore;
**concentrate;
***tailings

REFERENCES

The following references, to the extent that they provide exemplary procedural or other details supplementary to those set forth herein, are specifically incorporated herein by reference.

Christy, *Transaction of the American Institute of Mining Engineering*, 17:3, 1888.
Croasdale, J. *Engineering and Mining*, 312, 1903.
Egleston, In: *The Metallurgy of Silver, Gold and Mercury in the United States*, 1:261, John Wiley, 1887.
Eisele et al. U.S. Bureau of Mines, Report N° 7489.
Ferron et al, In: *Chloride Metallurgy*, Vol. I:11, Canadian Institute of Mining, Metallurgy and Petroleum, 2002.
Frias et al., In: *Chloride Metallurgy*, Vol. I:29, Canadian Institute of Mining, Metallurgy and Petroleum, 2002.
Kappes et al., In: *Chloride Metallurgy*, Vol. I:69, Canadian Institute of Mining, Metallurgy and Petroleum, 2002.
Kruss and Schmidt, *Berichte der Deutschen Chemichen Gesellschaft*, 20:2634, 1887.
Latimer, In: *Oxidation State of the Elements*, 56-62, Prentice Hall, 1952.
Moyes and Houllis, In: *Chloride Metallurgy*, Vol. II:577, Canadian Institute of Mining, Metallurgy and Petroleum, 2002.
Varley et al., U.S. Bureau of Mines, Bulletin N° 211, 1923.
Voigt and Biltz, *Z. anorg. Chem.*, 133:277, 1924.

The invention claimed is:

1. A method for treating a polymetallic sulfide ore containing gold or silver, and further comprising a base metal selected from the group consisting of iron, aluminum, chromium, titanium, copper, zinc, lead, nickel, cobalt, mercury, tin, and mixtures thereof, the method comprising:

(a) providing a granulated polymetallic sulfide ore containing gold or silver having a particle size of less than about 35 mesh;
(b) oxidizing said granulated polymetallic sulfide ore at temperatures of at least about 300° C. to produce oxidized granules having a sulfur content of about 0.5% or less;
(c) chloride leaching of said oxidized granules, wherein said chloride leaching involves contacting said oxidized granules with a leaching solution comprising dissolved elemental chlorine, a high concentration of chloride, and a catalytic amount of bromide, to produce a pregnant solution of solubilized metal chlorides and a barren solid;
(d) recovering said barren solid from said pregnant solution to produce a purified pregnant solution; and
(e) selectively recovering gold or silver from said purified pregnant solution,
wherein the method is carried out at atmospheric pressure.

2. The method of claim 1, wherein said catalytic amount of bromide is about 1 percent by weight or less of the chloride present in said leaching solution.

3. The method of claim 2, wherein said catalytic amount of bromide is ranging from about 1.0 g/L to about 3.0 g/L of said leaching solution.

4. The method of claim 1, wherein said bromide is a bromide salt of sodium or potassium.

5. The method of claim 1, wherein said chloride leaching is operated at temperatures near ambient temperatures over a period ranging from about 2 to about 5 hours.

6. The method of claim 5, wherein said ambient temperatures range from about 35 to about 45° C.

7. The method of claim 1, wherein said chloride is in the form of sodium chloride in a concentration ranging from about 275 g/L to about 300 g/L.

8. The method of claim 1, wherein said chloride is in the form of potassium chloride in a concentration ranging from about 190 g/L to about 225 g/L.

9. The method of claim 1, wherein a first portion of a concentrated chloride brine solution containing a trace amount of bromide is circulated through an electrolytic cell to separately and concomitantly produce a caustic solution and a brine solution including dissolved elemental chlorine, and wherein said brine solution including dissolved elemental chlorine is combined with a second portion of said concentrated chloride brine solution to produce said leaching solution.

10. The method of claim 1, wherein said oxidizing (b) is performed using lean air.

11. The method of claim 10, wherein said lean air includes an oxygen content of about 10%.

12. The method of claim 10, wherein following said oxidizing (b), said lean air is cooled in a settling chamber allowing for a volatile species to be collected; wherein a first portion of said lean air and sulfur dioxide is recycled from said settling chamber to said oxidizing (b); and wherein a second portion of said lean air and sulfur dioxide is directed to a sulfur dioxide scrubbing unit.

13. The method of claim 1, wherein said oxidizing (b) is performed at temperatures ranging from about 400 to about 600° C.

14. The method of claim 1, wherein said recovering (d) eliminates the barren solid from the pregnant solution of solubilized metal chlorides as a filtrate, and wherein the barren solid is washed with a brine solution to produce washings and a sterile solid, the washings being combined with the filtrate to produce said purified pregnant solution.

15. The method of claim 14, wherein said sterile solid is washed with water to produce a salt containing solution, said salt containing solution being concentrated and recycled to said chloride leaching (c).

16. The method of claim 15, wherein said salt containing solution includes sodium chloride, sodium bromide or a mixture thereof.

17. The method of claim 15, wherein said salt containing solution includes potassium chloride, potassium bromide, or a mixture thereof.

18. The method of claim 14, wherein said brine solution comprises a concentration of sodium chloride ranging from about 275 g/L to about 300 g/L.

19. The method of claim 14, wherein said brine solution comprises a concentration of potassium chloride ranging from about 190 g/L to about 225 g/L.

20. The method of claim 1, wherein in said selective recovering (e), said purified pregnant solution is treated with activated carbon to produce a reaction mixture including a carbon cake rich in gold or silver, wherein said carbon cake is subsequently removed from the reaction mixture, and wherein said gold or silver is stripped from said carbon cake and selectively recovered by leaching and subsequent electrowinning or by precipitation.

21. The method of claim 1, wherein said gold or silver are recovered in yields in excess of about 80%.

22. The method of claim 1, wherein said polymetallic sulfide ore comprises gold and silver.

23. The method of claim 1, wherein said selective recovering (e) yields a solution essentially deprived of gold and silver, the method further comprising subsequent treatment of said solution deprived of gold and silver so as to precipitate and remove solubilized base metal chlorides.

24. The method of claim 23, wherein said solution deprived of gold and silver is subsequently treated with a caustic solution to produce a first reaction mixture having a pH ranging from about 2.5 to about 3.5, further producing a precipitate comprising a first set of base metals comprising at least one hydrated metal oxide selected from the group consisting of iron, aluminum, chromium and titanium, and recovering said precipitate yielding a first solution essentially devoid of iron, aluminum, chromium and titanium.

25. The method of claim 24, further comprising subsequently treating said first solution with a caustic solution to produce a second reaction mixture having a pH ranging from about 3.5 to about 14, further producing a precipitate including a second set of base metals comprising at least one hydrated metal oxide selected from the group consisting of nickel, copper, cobalt, zinc, lead and tin, and recovering said precipitate yielding a second solution essentially devoid of nickel, copper, cobalt, zinc, lead and tin.

\* \* \* \* \*